Aug. 15, 1967   C. P. WEISS   3,335,526
PIPE SCARFING TOOL
Filed Jan. 21, 1965

INVENTOR.
CHARLES P. WEISS
BY
Leonard H. King
ATTORNEY.

United States Patent Office 3,335,526
Patented Aug. 15, 1967

3,335,526
PIPE SCARFING TOOL
Charles P. Weiss, Hempstead, N.Y., assignor to Koppers Company, Inc., a corporation of Delaware
Filed Jan. 21, 1965, Ser. No. 426,831
6 Claims. (Cl. 51—73)

This invention relates to an improved scarfing tool and more particularly to a portable tool that will produce a taper on the end of a length of pipe.

One method of securing an end fitting to a length of pipe is to taper the end of the pipe and cement the similarly tapered fitting thereto. Since the holding power of the joint so formed is due, at least in part, to the resulting inclined plane effect, it is imperative that the taper on the end of the pipe be accurately formed. This machining operation presents something of a problem particularly when it must be done in the field where shop facilities are not readily available.

The present invention is directed towards a simple, low cost attachment that may be applied to a power driven tool such as a drill. A variety of cutting mediums may be employed such as an abrasive cloth, or a diamond cutter in the shape of a cone having the desired included angle. The cutting medium is of course readily removable and replaceable, the choice of cutters depending upon the nature of the material being shaped.

In one form of the present invention, the cutting member is secured within a hollow, open ended housing having the desired taper on the inside diameter thereof. The housing surrounds, at least partially, a pilot piece having an outside diameter of such size as to assure a reasonably close fit with the inside diameter of the pipe to be machined. The pilot piece is hollow and is provided with end bearings so that a stem may be rotatably journaled therein. The housing is pinned to the stem in such a manner that the shank portion of the stem may be received in the chuck of a drill.

As may best be seen in the drawing, the inside surface of the housing is concentrically spaced from the outside surface of the pilot piece. It should be further noted that while the stem and the housing are driven as a unit by the drill, the pilot piece does not rotate because of the ball bearing mounting arrangement. Thus the possibility of scoring the inside surface of the pipe is eliminated. Since one application of the improved scarfing tool is in the field of resin bonded glass fiber pipes, the bearings are of the sealed type and the housing is provided with several outlet ports for the fine glass powder that will result from the scarfing operation.

The operation of the improved scarfing tool is relatively simple and its order of complexity, when secured in the chuck of a drill, is comparable to that encountered when drilling a hole. The pilot piece is inserted into the pipe end until the cutting surface makes contact with the outside surface of the pipe. The drill is then energized to begin the scarfing process. The proper tool pressure may be quickly determined by the operator and the tool may readily be removed without disturbing the concentric relationship of the tapered cutting member and the pilot piece. This permits frequent inspection of the work during the scarfing operation.

The quality of the scarf produced by the apparatus of the present invention is superior to the scarf made by a blade. By the use of an extremely coarse abrasive cutter, a rough finish may be effected which is highly desirable in the production of a bonded joint. The degree of finish roughness may of course be varied to suit the particular application since the cutting medium is readily removable and replaceable. At all times, however, the tapered cutting cone is maintained concentric with the pilot piece so that the scarfing is similarly concentric. As will be seen in the drawing, the axial length of the scarf is determined by the depth of penetration of the pilot piece into the pipe.

Accordingly, it is an object of the present invention to provide an improved, portable scarfing tool.

Another object is to provide a scarfing tool that is utilized with a power driven hand tool.

An additional object of the present invention is to provide that the cutting medium of the improved scarfing tool be readily removable and replaceable.

A still further object is to provide means for centering and holding stationary the pipe to be cut while the scarfing tool rotates thereabout.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing, like reference characters designate like parts.

Figure 1A:
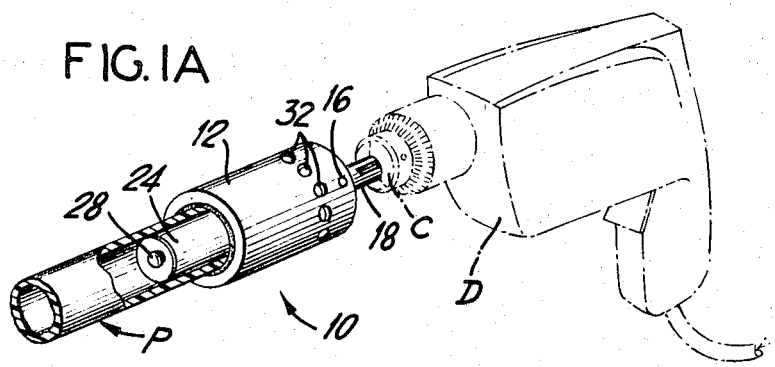
FIG. 1A is a pictorial view, partly broken away and partly in phantom, illustrating the application of the present invention in combination with an electrically power driven hand drill.
Figure 1B:
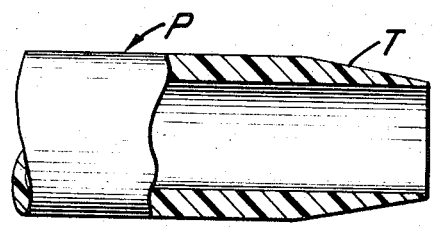
FIG. 1B is a fragmentary side elevation view, partly in section, of the scarfed end of a length of plastic pipe.

Referring now to the drawing and particularly to FIG. 1A and FIG. 1B, the scarfing tool 10 comprising the present invention is shown in combination with a hand drill D. Any of the conventional power sources may be utilized to drive the drill, there being shown the more usual line cord adapted to be plugged into a standard wall outlet. Chuck C of the drill holds the scarfing tool in a manner to be more fully described hereinafter. As a result of the scarfing operation, the outer surface of the end of the pipe P is tapered at T, as shown in FIG. 1B. For purposes of illustration, a pipe, such as may be fabricated from resin bonded glass fibers, will be used in conjunction with the scarfing tool.

Figure 2:
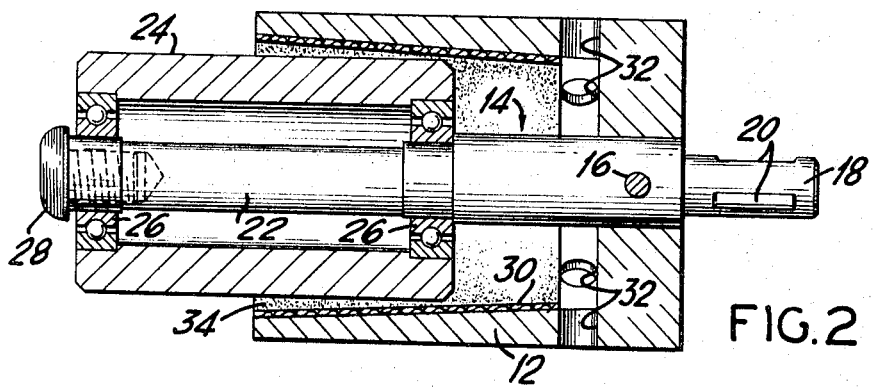
FIG. 2 is a sectional side elevation view of the improved pipe scarfing tool.

FIG. 2 illustrates the compactness and simplicity of the present invention. The scarfing tool 10 is provided with a central piloting shaft 14 proximate one end of which is secured a hollow, open end housing 12. At assembly, pin 16 is driven through both housing 12 and shaft 14 so that this will then become a single unitary structure. Other means may also be employed to accomplish the same results.

The shank end 18 of shaft 14 is adapted to fit into and be retained by chuck C of the drill and may therefore be provided with three equally spaced flats 20 as an optional feature. The opposite end 22 of shaft 14 which extends through and outwardly of the housing supports pilot piece 24. Bearings 26 are interposed between the pilot piece and the shaft so that the shaft may be rotated relative to the pilot piece. Threaded cap 28 serves to axially restrain the pilot piece, the outside diameter of which fits snugly into the inside diameter of the pipe to be machined.

The inside diameter of the housing is tapered, for example, at a 5° included angle and a cutting member 30 is secured thereto by means of an adhesive. FIG. 2 illustrates the use of an abrasive cloth although as will be explained in connection with the next embodiment, an abrasive sleeve may also be used. The housing is further provided with a plurality of radial apertures 32 so that the dust resulting from the scarfing operation may be exhausted.

In operation, the end of a length of pipe is supported on pilot piece 24, the opposite end of the pipe being suitably held such as in a clamp or vise (not shown). The scarfing tool 10 is then axially advanced while the housing is rotating so that the first end of the pipe enters the annular chamber 34 between the abrasive member and the pilot piece. The outside surface of the pipe will thereby be tapered and the shavings or dust will escape through apertures 32. It will be apparent then that while the housing and the shaft are rotated by the driving means, the pilot piece will not rotate because of the ball bearing mounting and therefore the inside surface of the pipe cannot be scored.

Figure 3:
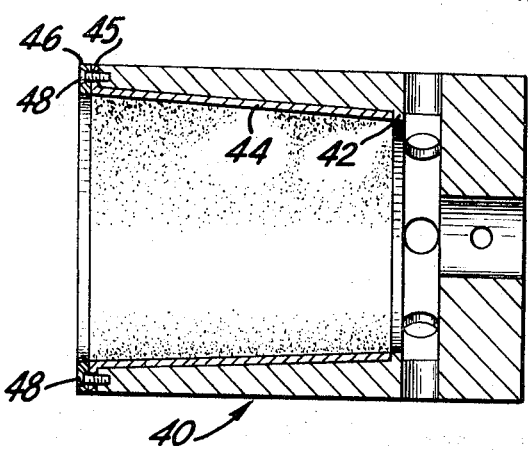
FIG. 3 is a sectional side elevation view of an alternative housing for the improved scarfing tool.

In FIG. 3, there is shown an alternative embodiment of the housing adapted for use with a rigid, sleevelike abrasive member such as a diamond cutter. Housing 40 is provided with an internal lip 42 against which bears one end of cutting sleeve 44. The opposite, flanged end 45 of the sleeve extends radially outward and is captured by means of a retainer 46. Screws 48 serve to hold the retainer 46 on the housing 40.

The apparatus described hereinabove and illustrated in the drawing is compact and simple to operate. It is inexpensive to manufacture and is adapted to accurately taper the end of a pipe even if that operation must be performed at the installation site where more sophisticated machine tools are not readily available. The construction of the tool is simple enough to permit the changeover from one abrasive cutting member to another. The tool is inexpensive enough to provide a range of tapers which may then be formed on the pipe end merely by interchanging the tool in the drill chuck.

There has been disclosed heretofore the best embodiments of the invention presently contemplated and it is to be understood that various changes and modifications may be made by those skilled in the art without departing from the spirit of the invention.

What is claimed is:
1. A pipe scarfing tool adapted to be driven by a power tool, said pipe scarfing tool comprising:
  (a) a shaft having first and second ends, said shaft first end being adapted to be secured to a power tool for rotation thereby;
  (b) a hollow pilot piece mounted concentrically on said shaft second end, whereby said shaft is angularly displaceable relative to said pilot piece, the pipe to be scarfed being seatable on said pilot piece outer surface;
  (c) a hollow, open ended housing rigidly secured to said shaft in concentric relationship thereabout, said housing concentrically enveloping at least a portion of said pilot piece, said housing having a tapered inside diameter; and
  (d) an abrasive cutting member positioned on the inside surface of said housing in confronting relationship to the outer surface of said pilot piece to define a concentrically tapered, annular cutting chamber thereabout.

2. The apparatus in accordance with claim 1 including bearing means interposed between said pilot piece and said shaft.

3. The apparatus in accordance with claim 1 wherein said housing is provided with a plurality of radial apertures for the egress of the cuttings resulting from the scarfing operation.

4. The apparatus of claim 1 wherein said cutting member is an abrasive cloth adhesively secured to the inside surface of said housing.

5. The apparatus in accordance with claim 1 including means to removably retain said abrasive cutting member.

6. The apparatus in accordance with claim 1 wherein the inside surface of said housing includes an inwardly depending lip, wherein said abrasive cutting member is a rigid, tapered sleeve in abutment at one end with said lip and wherein said housing includes means to retain said cutting member within said housing.

References Cited
UNITED STATES PATENTS

| | | | |
|---|---|---|---|
| 704,428 | 7/1902 | Allen | 51—73 |
| 2,595,541 | 5/1952 | Riordan | 144—205 |
| 2,746,497 | 5/1956 | Thompson | 144—205 |
| 3,188,674 | 6/1965 | Hobbs | 51—73 X |
| 3,266,345 | 8/1966 | Weisner | 144—205 |

ROBERT C. RIORDON, *Primary Examiner.*

D. G. KELLY, *Assistant Examiner.*